(12) United States Patent
Cheng et al.

(10) Patent No.: US 10,160,836 B2
(45) Date of Patent: Dec. 25, 2018

(54) WATER DISPERSIBLE HYPERBRANCHED POLYMER COMPOSITION

(71) Applicant: NIPSEA Technologies Pte Ltd, Singapore (SG)

(72) Inventors: Suh Jeng Cheng, Singapore (SG); Jian Hu, Singapore (SG); Xiaoqun Ye, Singapore (SG); Shaofeng Wang, Singapore (SG)

(73) Assignee: NIPSEA TECHNOLOGIES PTE LTD, Singapore (SG)

( * ) Notice: Subject to any disclaimer, the term of this patent is extended or adjusted under 35 U.S.C. 154(b) by 211 days.

(21) Appl. No.: 15/327,229

(22) PCT Filed: Aug. 4, 2015

(86) PCT No.: PCT/SG2015/050251
§ 371 (c)(1),
(2) Date: Jan. 18, 2017

(87) PCT Pub. No.: WO2016/068793
PCT Pub. Date: May 6, 2016

(65) Prior Publication Data
US 2017/0166705 A1  Jun. 15, 2017

(30) Foreign Application Priority Data

Oct. 31, 2014 (SG) .......................... 10201407131Y

(51) Int. Cl.
| | | |
|---|---|---|
| C09D 163/00 | (2006.01) | |
| C09D 201/00 | (2006.01) | |
| C08L 63/00 | (2006.01) | |
| C08G 83/00 | (2006.01) | |
| C08G 18/72 | (2006.01) | |
| C08G 18/73 | (2006.01) | |
| C08G 18/75 | (2006.01) | |
| C08G 18/76 | (2006.01) | |
| C08G 18/80 | (2006.01) | |
| C08G 18/28 | (2006.01) | |
| C09D 175/06 | (2006.01) | |
| C08G 18/42 | (2006.01) | |
| C09D 201/02 | (2006.01) | |

(52) U.S. Cl.
CPC ....... *C08G 83/006* (2013.01); *C08G 18/2845* (2013.01); *C08G 18/4283* (2013.01); *C08G 18/72* (2013.01); *C08G 18/73* (2013.01); *C08G 18/75* (2013.01); *C08G 18/755* (2013.01); *C08G 18/76* (2013.01); *C08G 18/8064* (2013.01); *C09D 175/06* (2013.01); *C09D 201/025* (2013.01)

(58) Field of Classification Search
None
See application file for complete search history.

(56) References Cited

FOREIGN PATENT DOCUMENTS

| CN | 102190792 A | * | 9/2011 | ............. C08G 65/48 |
|---|---|---|---|---|
| CN | 102924679 A | * | 2/2013 | ............. C08G 18/58 |
| KR | 1020100079024 A | | 7/2010 | |
| WO | 1996012754 A1 | | 5/1996 | |
| WO | 2003062306 A1 | | 7/2003 | |
| WO | 2008153587 A1 | | 12/2008 | |
| WO | 2013028133 A1 | | 2/2013 | |
| WO | 2013028134 A1 | | 2/2013 | |

OTHER PUBLICATIONS

Machine translation of CN-102190792-A (no date).*
Machine translation of CN-102924679-A (no date).*
International Application No. PCT/SG2015/050251, International Search Report dated Nov. 2, 2015.
International Application No. PCT/SG2015/050251, Written Opinion dated Nov. 2, 2015.

* cited by examiner

*Primary Examiner* — Michael J Feely
(74) *Attorney, Agent, or Firm* — Kilpatrick Townsend & Stockton LLP

(57) ABSTRACT

There is provided a composition comprising: (i) a hyperbranched polymer having peripheral reactive groups comprising epoxy functional groups and hydroxyl functional groups; and (ii) a compound having one or more hydrophilic functional groups, wherein the amount of epoxy functional groups relative to the total number of peripheral reactive groups does not render the hyperbranched polymer from being indispersible in an aqueous solvent. There is also provided a method of preparing the same and uses thereof.

20 Claims, 1 Drawing Sheet

WATER DISPERSIBLE HYPERBRANCHED POLYMER COMPOSITION

CROSS REFERENCE TO RELATED APPLICATIONS

This application is a national stage application under 35 U.S.C. § 371 of PCT/SG2015/050251 filed Aug. 4, 2015, which claims priority to Singapore application no. 10201407131Y filed Oct. 31, 2014, the disclosures of which are hereby incorporated by reference herein in their entireties.

TECHNICAL FIELD

The present invention generally relates to macromolecular chemical compounds. More specifically, the present invention relates to a polymer composition, methods of preparing the same and uses thereof.

BACKGROUND

Hyperbranched polymers have been used in the field of manufacturing protective coatings due to its unique structure which leads to the formation of high performance coatings. Hyperbranched polymers have a high number of reactive functional groups exposed at the peripheral edges of the hyperbranched molecule and therefore provide high cross-linking density and high surface protection performance when used in protective coatings.

However, due to the lack of dispersibility of such high molecular weight polymers in water, protective coatings comprising hyperbranched polymers are conventionally provided as organic solvent-based coating systems.

In an age where regulatory requirements are increasingly stricter with regard to volatile organic compounds ("VOC") emission levels, aqueous-based protective coatings have started to replace solvent-based coating systems in order to reduce the use of organic solvents.

Hence, there have been efforts to increase the dispersibility of high molecular weight polymers in aqueous-based systems.

In known solutions, dendritic polymers are modified by incorporating ionic groups thereon. A known method is by the reaction of hydroxyl functional dendritic polymers with acid anhydrides followed by neutralization of the mixture. In this method, carboxyl groups are grafted onto the peripheral surface of the dendritic polymers to improve its dispersibility in water.

In another known water-based dendritic polymer coating, the coating comprises a fluorine-containing dendritic polymer having at least one pendant fluorocarbon moiety and at least one pendant anionic moiety. Presumably, the presence of the anionic moieties improves the dispersibility of the dendritic polymer in water.

However, it has been observed that the modification of dendritic polymers to incorporate excess ionic groups, for example carboxyl groups, will adversely affect coating performance, especially with respect to the impact resistance, chemical resistance and water resistance of the coating.

Accordingly, there is a need to provide an aqueous-based polymer composition that overcomes, or at least ameliorates, the disadvantages described above.

In particular, there is a need to provide a coating composition capable of achieving dispersibility in an aqueous solvent, and at the same time, capable of providing coatings that exhibit comparable, if not superior, performance when compared with conventional water-based coatings.

SUMMARY

In a first aspect, there is provided a composition comprising: (i) a hyperbranched polymer having peripheral reactive groups comprising epoxy functional groups and hydroxyl functional groups; and (ii) a compound having one or more hydrophilic functional groups, wherein the amount of epoxy functional groups relative to the total number of peripheral reactive groups does not render the hyperbranched polymer from being indispersible in an aqueous solvent.

Advantageously, the hyperbranched polymer possesses greater dispersibility in an aqueous solvent when comprised in the disclosed composition as compared to the dispersibility of the hyperbranched polymer in an aqueous solvent alone. Further advantageously, the disclosed composition allows dispersibility of a hyperbranched polymer comprising peripheral reactive epoxy functional groups in an aqueous solvent. Further advantageously, the peripheral reactive epoxy functional groups of the hyperbranched polymer imparts improved mechanical properties to a coating composition formed from the disclosed composition as compared to compositions that do not comprise hyperbranched polymers having peripheral reactive epoxy functional groups or compositions that do not comprise hyperbranched polymers.

The amount of epoxy functional groups relative to the total number of peripheral reactive groups is advantageously optimized to render the hyperbranched polymer dispersible in an aqueous solvent. If the amount of epoxy functional groups relative to the total number of peripheral reactive groups is too high, the composition may be at least partially indispersible or even completely indispersible in an aqueous solvent. If the amount of epoxy functional groups relative to the total number of peripheral reactive groups is too low, a coating composition formed from the disclosed composition may possess inferior mechanical properties.

In embodiments, the disclosed composition may further comprise an aqueous solvent. Advantageously, the composition may be at least partially dispersible in the aqueous solvent. In some embodiments, the composition is substantially dispersible in the aqueous solvent. In other embodiments, the composition is completely dispersible in the aqueous solvent.

In embodiments, the compound having one or more hydrophilic functional groups, referred to herein as the hydrophilic compound, is present in an amount sufficient to disperse said hyperbranched polymer in said aqueous solvent.

Advantageously, the hydrophilic compound aids in increasing the dispersibility of the hyperbranched polymer in the aqueous solvent.

In a second aspect, there is provided a method of preparing a composition, comprising: (a) reacting a cross-linker compound comprising at least two cross-linkable peripheral groups with an epoxy compound comprising at least one peripheral epoxy functional group and at least one cross-linkable peripheral group to form a precursor compound having at least one unreacted cross-linkable peripheral group and at least one peripheral epoxy functional group; (b) mixing a hyperbranched polymer having peripheral reactive hydroxyl groups with a compound having one or more hydrophilic functional groups; (c) reacting the precursor compound with at least one peripheral reactive hydroxyl group of the hyperbranched polymer to form a hyperbranched polymer having peripheral reactive groups comprising epoxy functional groups and hydroxyl functional groups, wherein the amount of epoxy functional groups relative to the total number of peripheral reactive groups does not render the hyperbranched polymer from being indispersible in an aqueous solvent.

Advantageously, the disclosed method provides a simpler method as compared to known methods of functionalizing epoxy functional groups directly onto a hyperbranched polymer. Further advantageously, the disclosed method produces substantially or completely no by-products. The disclosed method is therefore more efficient in terms of conversion than prior art methods. Also advantageously, hazardous chemicals used in known methods can be avoided in the disclosed method. The disclosed method is therefore safer than prior art methods.

In a third aspect, there is provided the composition as disclosed herein, for use in the preparation of a single component coating composition.

In a fourth aspect, there is provided an aqueous-dispersible single component coating composition comprising: the composition as disclosed herein; and one or more crosslinkers.

Advantageously, the disclosed coating composition produces reduced VOCs due to the bulk aqueous solvent phase used.

As the disclosed coating composition comprises the composition defined herein, the coating composition possesses superior coating properties. For example, the coating composition can be applied without forming bubbles or blisters.

DEFINITIONS

The following words and terms used herein shall have the meaning indicated:

The term "disperse" and grammatical variants thereof, refers to the distribution of a particulate phase or phases, solid particles or droplets, substantially uniformly throughout a liquid continuous phase, without settling or separating or precipitating from the liquid continuous phase at ambient temperature and pressure. The particulate phase, solid particle or droplet is generally of a size of between about 1 nm and about 1 μm. In the context of the present disclosure, ambient temperature refers to temperatures in the range of about 15° C. to about 40° C., or about 15° C. to 30° C., or about 20° C. to about 40° C., or about 20° C. to about 30° C., or about 25° C. to about 30° C., while ambient pressure refers to standard atmospheric pressure of about 1 atm or 101.325 kPa.

The term "hydrophilic" when referring to a material is to be interpreted broadly to include any property of the material that causes it to be substantially soluble in water.

The term "functionalized" and grammatical variants thereof, as used herein, is to be interpreted broadly to refer to a chemical compound that is provided with one or more chemical moieties to impart the compound with a specific function, e.g. chemical reactivity, associated with the chemical moiety. In the present disclosure, the term "functionalized" and its grammatical variants are used interchangeably with the term "modified" and its grammatical variants.

The term "peripheral reactive group" as used herein refers to any elements or combinations of elements positioned at the terminus of a contiguous chain of atoms or moieties, whereby these elements or combination of elements have sufficient reactivity to be used in crosslinking or coupling with a pendent group.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

DISCLOSURE OF OPTIONAL EMBODIMENTS

Figure 1:
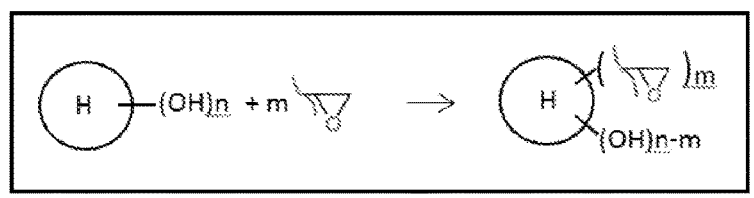
FIG. 1 is a schematic reaction scheme showing an exemplary, non-limiting, reaction mechanism associated with the disclosed method.

Exemplary, non-limiting embodiments of a composition will now be disclosed.

In embodiments, there is provided a composition comprising: (i) a hyperbranched polymer having peripheral reactive groups comprising epoxy functional groups and hydroxyl functional groups; and (ii) a compound having one or more hydrophilic functional groups, wherein the amount of epoxy functional groups relative to the total number of peripheral reactive groups does not render the hyperbranched polymer from being indispersible in an aqueous solvent.

The hyperbranched polymer having peripheral reactive groups that include, in part, epoxy functional groups imparts improved mechanical properties to a coating composition formed from the disclosed composition. The improved mechanical properties may include impact resistance, flexibility, scratch resistance, abrasion resistance, alkaline resistance and water resistance.

The mechanical properties of the disclosed coating composition may be comparable, if not improved, when compared with a coating composition that does not comprise hyperbranched polymers or a coating composition comprising hyperbranched polymers having only peripheral reactive hydroxyl functional groups. In embodiments, the impact resistance of the disclosed coating composition may be increased by more than about 30%, or more than about 40%, or more than about 50%, or more than about 60%, or more than about 70%, or more than about 80%, or more than about 90%, when compared with a coating composition that does not comprise hyperbranched polymers. In embodiments, the ductility of the disclosed coating composition, i.e. the ability of the coating to undergo plastic deformation when measured according to the DIN EN ISO 1520 test, may be increased by more than about 10%, or more than about 20%, or more than about 30%, or more than about 40%, or more than about 50%, when compared with a coating composition that does not comprise hyperbranched polymers. In embodiments, the scratch resistance of the disclosed coating composition when measured according to the ISO 12137-2:1997 test may be increased by more than about 40%, or more than about 50%, or more than about 60%, or more than about 70%, or more than about 80%, or more than about 90%, when compared with a coating composition that does not comprise hyperbranched polymers. In embodiments, the impact resistance or pencil hardness of the disclosed coating composition when measured according to the ASTM D2794 test may be increased by about 1 grade, or about 2 grades, or about 3 grades, when compared with a coating composition comprising hyperbranched polymers having only peripheral reactive hydroxyl functional groups; or about 1 grade, or about 2 grades, or about 3 grades, when compared with a coating composition that does not comprise hyperbranched polymers.

The hyperbranched polymer comprises epoxy functional peripheral groups in an amount that does not render the hyperbranched polymer from being indispersible in an aqueous solvent. Hence, an aqueous solvent can advantageously be used as the bulk liquid continuous phase in the disclosed composition and the disclosed coating composition. Aqueous-based compositions can therefore be achieved.

The epoxy functional groups may be present in a suitable amount to prevent the hyperbranched polymer from separating out from the aqueous solvent. In embodiments, the epoxy functional groups are present in a range of from about 1% to about 20%, or about 1.5% to about 20%, or about 2% to about 20%, or about 2.5% to about 20%, or about 3% to about 20%, or about 3.5% to about 20%, or about 4% to about 20%, or about 4.5% to about 20%, or about 5% to about 20%, or about 5.5% to about 20%, or about 6% to about 20%, or about 6.5% to about 20%, or about 7% to about 20%, or about 8% to about 20%, or about 9% to about 20%, or about 10% to about 20%, or about 1% to about 15%, or about 1.5% to about 15%, or about 2% to about 15%, or about 2.5% to about 15%, or about 2.5% to about 10%, or about 3% to about 10%, or about 3.5% to about 10%, or about 4% to about 10%, or about 4.5% to about 10%, or about 5% to about 10%, or about 2.5% to about 7%, or about 3% to about 7%, of the total number of peripheral reactive groups of the hyperbranched polymer. In embodiments, the epoxy functional groups are present in a number not greater than about 15%, about 14%, about 13%, about 12%, about 11%, or about 10% of the total number of peripheral reactive groups of the hyperbranched polymer.

If the epoxy functional groups are present in more than about 20% of the total number of peripheral reactive groups of the hyperbranched polymer, the hyperbranched polymer may separate out from the aqueous solvent phase, thereby causing phase separation. If the epoxy functional groups are present in less than about 1% of the total number of peripheral reactive groups of the hyperbranched polymer, a coating composition formed from the disclosed composition may possess inferior mechanical properties.

In embodiments, the hyperbranched polymer having peripheral reactive groups includes hyperbranched dendritic polymers, ultra-branched dendritic polymers or dendrimers. In embodiments, the hyperbranched polymer may comprise from about 8 to about 128, or about 16 to about 128, or about 8 to about 64, theoretical pendant/peripheral reactive groups per molecule of hyperbranched polymer. In embodiments, the hyperbranched polymer may comprise about 8, 16, 32, 64, or 128 peripheral reactive groups.

In embodiments, the hyperbranched polymer may be a dendritic polymer. The dendritic polymer may be substantially globular in shape and may have a dispersity [Mw/Mn] of greater than or equal to 1, e.g., from 1 to 1.8, from 1 to 1.5, or from 1 to 1.3. In embodiments, the dispersity (or also known as polydispersity index, PDI) may depend on the generation of the dendritic polymer. In embodiments the dispersity of the dendritic polymer may be selected from 1.1, 1.2, 1.3, 1.4, 1.5, 1.6, 1.7, 1.8, or 1.9.

The peripheral reactive groups of the hyperbranched polymer comprise epoxy functional groups and hydroxyl functional groups. In embodiments, the native peripheral reactive groups of the hyperbranched polymer may be hydroxyl functional groups, wherein at least a portion of the native peripheral reactive groups have been functionalized with epoxy functional groups to yield a hyperbranched polymer having peripheral reactive groups that include epoxy and hydroxyl functional groups, or in other words, a hydroxyl functional hyperbranched polymer modified with peripheral reactive epoxy functional groups.

In embodiments, the native peripheral reactive groups of the hyperbranched polymer may be functionalized with further functional groups, in addition to epoxy functional groups. Advantageously, the further functional groups may impart further desired properties, e.g. UV or moisture curability, to the disclosed composition. The peripheral reactive groups of the disclosed hyperbranched polymer may further include carboxyl functional groups, acrylate functional groups, halogen, or combinations thereof.

In embodiments, the native hyperbranched polymer is a hydroxyl-terminated dendritic polyester polyol having from about 8 to about 128 theoretical pendant/peripheral —OH groups, wherein at least a portion of the pendant/peripheral —OH groups have been substituted by epoxy groups. In embodiments, the dendritic polyester may comprise about 8, 16, 32, 64, or 128 peripheral groups. In embodiments, the dendritic polymer may have a hydroxyl value ranging from 300 to 550 mg KOH/g, 300 to 340 mg KOH/g, 470 to 500 mg KOH/g, or 490 to 530 mg KOH/g.

In embodiments where the hyperbranched polymer comprises peripheral reactive hydroxyl functional groups and peripheral reactive epoxy functional groups, the ratio of the number of hydroxyl functional groups to epoxy functional groups may be in a range of from about 100:1 to about 5:1, or from about 50:1 to about 5:1, or from about 25:1 to about 5:1, or from about 100:1 to about 10:1, or from about 100:1 to about 25:1, or from about 25:1 to about 10:1.

In embodiments, the composition may comprise one or more of the hyperbranched polymers as disclosed herein. For example, the composition may comprise a hyperbranched polymer that has about 5% of a total of 64 peripheral reactive groups modified with epoxy functional peripheral groups, and a hyperbranched polymer that has about 10% of a total of 16 peripheral reactive groups modified with epoxy functional peripheral groups.

In embodiments, the compound having one or more hydrophilic functional groups or hydrophilic compound is present in the disclosed composition in an amount sufficient to disperse the hyperbranched polymer in the aqueous solvent. In embodiments, the composition may comprise one or more hydrophilic compounds. Advantageously, the hydrophilic compound further increases the dispersibility of the hyperbranched polymer in the aqueous solvent.

In embodiments, the weight ratio of the hyperbranched polymer to the hydrophilic compound is in a range of from about 1:10 to about 10:1. In embodiments, the weight ratio of hyperbranched polymer to the hydrophilic compound may be about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1 or about 9:1.

In one embodiment, the weight ratio of the hyperbranched polymer to the hydrophilic compound is 1:1. In another embodiment, the amount of hydrophilic compound may be provided in excess with respect to the hyperbranched polymer. The weight ratio of the hyperbranched polymer to the hydrophilic compound may be about 1:2, about 1:4 or about 1:9.

Advantageously, it has been found that providing the hydrophilic compound in excess greatly decreases the viscosity of the composition and accordingly improves the workability of the composition for coating or film formation. Also advantageously, it has been found that a composition having the hydrophilic compound in excess can still form coatings with comparable qualities (e.g. pencil hardness) when compared to coatings formed from compositions having a higher proportion of hyperbranched polymer.

In one embodiment, the weight ratio of hyperbranched polymer to the hydrophilic compound may be from about 1:9 to about 4:1. In another embodiment, the weight ratio of hyperbranched polymer to the hydrophilic compound may be from about 1:5 to about 5:1. Advantageously, it has been found that such weight ratios provide optimal dispersibility of the disclosed composition in an aqueous solvent whilst maintaining good coating performance.

The hydrophilic compound may have an average molecular weight of less than about 500. In one embodiment, the hydrophilic compound may have an average molecular weight of less than about 400. In yet another embodiment, the hydrophilic compound may have an average molecular weight of less than about 300. In still another embodiment, the hydrophilic compound may have an average molecular weight of less than about 200. Advantageously, a hydrophilic compound having an average molecular weight of about 500 or less may be more effective with respect to dispersing the hyperbranched polymer in the aqueous solvent. Without being bound by theory, it is postulated that the small molecular size of the hydrophilic compound increases the dispersibility of the composition in an aqueous solvent due to higher specific surface area of the hydrophilic compound for electrostatic interactions between its hydrophilic functional groups and the polar groups of the aqueous solvent. This in turn results in an overall increase in dispersibility of the composition in aqueous solvents.

Advantageously, the hydrophilic compound may form strong hydrogen bonds with both the hyperbranched polymer as well as the aqueous solvent and thereby promote the dispersibility of hyperbranched polymer in the aqueous solvent.

In embodiments, the hydrophilic functional groups of the hydrophilic compound may be selected from the group consisting of: hydroxyl groups, halogen groups, carbonyl groups, carboxyl groups, mixtures thereof and combinations thereof.

In embodiments, the hydrophilic compound may be selected from the group consisting of: alcohols, carboxylic acids, hydroxyl acid, halogenated alkyls, halogenated olefins, amines, alkylamines, alkenylamines, olefinic alcohols, cycloalkyl alcohol, cycloalkenyl alcohol and mixtures thereof. In one embodiment, the hydrophilic compound is selected to be an alcohol, such as diols and glycols. In another embodiment, the hydrophilic compound is selected to be a cycloalkyl alcohol. In yet another embodiment, the hydrophilic compound is selected to be a carboxylic acid.

Where the hydrophilic compound comprises hydroxyl functionality, it is preferred that the hydrophilic compound comprises at least from about 2 to about 6 hydroxyl functional groups per molecule of the hydrophilic compound.

In one embodiment, the hydrophilic compound may comprise from about 2 to about 15 carbon atoms per molecule.

In embodiments, the hydrophilic compound is a low molecular weight cycloaliphatic alcohol or diol, such as, cyclopropane alcohol, cyclopropene alcohol, cyclobutane alcohol, cyclopentane alcohol, cyclohexane alcohol, or cycloheptane alcohol. The alcohols may be selected from mono, diol and triol alcohols having from 1 to 7 carbon atoms.

In one embodiment, the hydrophilic compound is 1,6-cyclohexanedimethanol. In another embodiment, the hydrophilic compound is lactic acid.

The peripheral reactive epoxy functional group of the hyperbranched polymer may be covalently bonded to a native peripheral reactive hydroxyl group by a cross-linker compound. The peripheral reactive epoxy functional group of the hyperbranched polymer may be covalently bonded to a hydroxyl group by a cross-linker compound. The hyperbranched polymer comprising native peripheral reactive hydroxyl groups may be functionalized with a cross-linker compound or a precursor compound comprising one or more epoxy functional groups.

Advantageously, the disclosed method has a simpler reaction route as compared to methods that convert the native peripheral reactive groups of a hyperbranched polymer to yield peripheral reactive epoxy functional groups, e.g. conversion of peripheral hydroxyl groups to peripheral epoxy groups. Instead, the peripheral reactive epoxy functional groups are advantageously provided on the hyperbranched polymer via a cross-linker compound.

Any cross-linker compound comprising a functional moiety capable of reacting with the peripheral reactive groups of the hyperbranched polymer and a functional moiety capable of reacting with an epoxy compound comprising the epoxy group, may be used as a cross-linker in the disclosed composition. In embodiments, the cross-linker compound may be selected from the group consisting of: diisocyanates, triisocyanates, polyisocyanates, isocyanurates and mixtures thereof. In embodiments, the cross-linker compound is selected from the group consisting of: diphenylmethane 4,4'-diisocyanate; methylenebis-4,4'-isocyanatocyclohexane; 1,6-hexamethylene diisocyanate (HDI); 1,4-cyclohexane diisocyanate; p-phenylene diisocyanate; triphenylmethane-4,4',4",-triisocyanate; methylene diphenyl diisocyanate (MDI); toluene diisocyanate (TDI); tetramethylxylene diisocyanate; isophorone diisocyanate (IPDI); and mixtures thereof.

In embodiments, the aqueous solvent of the composition is water. In an embodiment, the aqueous solvent is de-ionized water. Advantageously, the disclosed composition can be used to prepare aqueous-based, organic solvent-free coatings, which are desirable for their low volatile organic compounds (VOC) emissions. Therefore, the disclosed compositions are advantageously free of any VOC when mixed in an aqueous phase solvent. Further advantageously, the prepared coatings have comparable, if not superior, pencil hardness, chemical resistance and water resistance relative to coatings prepared from conventional aqueous-based polymer compositions. In embodiments, the composition further comprises one or more surfactants. In embodiments, the surfactants may be selected from cationic, anionic, amphoteric, zwitterionic or non-ionic surfactants, or combinations thereof.

In an embodiment, the surfactant used is non-ionic. Advantageously, non-ionic surfactants impart stability to the compositions.

Exemplary, non-limiting embodiments of a method of preparing a composition will now be disclosed.

In embodiments, there is provided a method of preparing a composition, comprising: (a) reacting a cross-linker compound comprising at least two cross-linkable peripheral groups with an epoxy compound comprising at least one peripheral epoxy functional group and at least one cross-linkable peripheral group to form a precursor compound having at least one unreacted cross-linkable peripheral group and at least one peripheral epoxy functional group; (b) mixing a hyperbranched polymer having peripheral reactive hydroxyl groups with a compound having one or more hydrophilic functional groups; (c) reacting the precursor compound with at least one peripheral reactive hydroxyl group of the hyperbranched polymer to form a hyperbranched polymer having peripheral reactive groups comprising epoxy functional groups and hydroxyl functional groups, wherein the amount of epoxy functional groups relative to the total number of peripheral reactive groups does not render the hyperbranched polymer from being indispersible in an aqueous solvent.

In embodiments, the disclosed method may be used to prepare the disclosed composition.

The disclosed method is advantageous over known methods of grafting epoxy functional groups directly onto the hyperbranched polymer. The disclosed method advantageously produces substantially lesser or completely no by-products.

In embodiments, the disclosed method involves the chemical bonding of a precursor compound to the hyperbranched polymer, where the precursor compound contains at least one unreacted cross-linkable peripheral group for covalent bonding with a peripheral reactive group of the hyperbranched polymer backbone. In an example, the precursor compound contains at least one free peripheral isocyanate group (—NCO) for covalent bonding with a native peripheral reactive hydroxyl group of the hyperbranched polymer backbone. Advantageously, the disclosed method can be performed at lower temperatures compared to conventional functionalization techniques.

In embodiments, step (a) involves reacting a cross-linker compound having at least two terminal cross-linkable groups with one or more epoxy compounds, each epoxy compound comprising at least one cross-linkable functional group reactive with a terminal cross-linkable group of the cross-linker compound. Each epoxy compound may further comprise at least one peripheral epoxy group to subsequently functionalize the native hyperbranched polymer with peripheral epoxy groups.

In embodiments, the at least two terminal cross-linkable groups of the cross-linker compound are isocyanate groups. The cross-linker compound may be one as disclosed herein. In an embodiment, the cross-linker compound is selected from the group consisting of: diisocyanates, triisocyanates, polyisocyanates, isocyanurates and mixtures thereof. In an embodiment, the cross-linker compound is selected from the group consisting of: diphenylmethane 4,4'-diisocyanate; methylenebis-4,4'-isocyanatocyclohexane; 1,6-hexamethylene diisocyanate (HDI); 1,4-cyclohexane diisocyanate; p-phenylene diisocyanate; triphenylmethane-4,4',4",-triisocyanate; methylene diphenyl diisocyanate (MDI); toluene diisocyanate (TDI); tetramethylxylene diisocyanate; isophorone diisocyanate (IPDI); and mixtures thereof.

In embodiments, the epoxy compound may have the following structure:

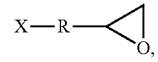

wherein X is the terminal cross-linkable group selected from the group consisting of —SH and —OH; and R is independently selected from the group consisting of: optionally substituted $C_1$-$C_6$ alkyl, $C_1$-$C_6$ heteroalkyl, carbocycle, aryl or heteroaryl.

The term "alkyl" refers to a straight- or branched-chain alkyl group having from 1 to 6 carbon atoms in the chain. Exemplary alkyl groups include methyl (Me), ethyl (Et), n-propyl, isopropyl, butyl, isobutyl, sec-butyl, tert-butyl (tBu), pentyl, isopentyl, tert-pentyl, hexyl, isohexyl, and the like.

The term "heteroalkyl" refers to a straight- or branched-chain alkyl group having from 2 to 6 atoms in the chain, one or more of which is a heteroatom selected from S, O, and N. Exemplary heteroalkyls include alkyl ethers, secondary and tertiary alkyl amines, alkyl sulfides, and the like.

The term "aryl" refers to a carbocyclic (consisting entirely of carbon and hydrogen) aromatic group or a heterocyclic aromatic group. Exemplary aryls include, but are not limited to, phenyl, naphthyl, indenyl, indanyl, azulenyl, fluorenyl, anthracenyl, furyl, thienyl, pyridyl, pyrrolyl, oxazolyly, thiazolyl, imidazolyl, pyrazolyl, 2-pyrazolinyl, pyrazolidinyl, isoxazolyl, isothiazolyl, 1,2,3-oxadiazolyl, 1,2,3-triazolyl, 1,3,4-thiadiazolyl, pyridazinyl, pyrimidinyl, pyrazinyl, 1,3,5-triazinyl, 1,3,5-trithianyl, indolizinyl, indolyl, isoindolyl, 3H-indolyl, indolinyl, benzo[b]furanyl, 2,3-dihydrobenzofuranyl, benzo[b]thiophenyl, 1H-indazolyl, benzimidazolyl, benzthiazolyl, purinyl, 4H-quinolizinyl, quinolinyl, isoquinolinyl, cinnolinyl, phthalazinyl, quinazolinyl, quinoxalinyl, 1,8-naphthyridinyl, pteridinyl, carbazolyl, acridinyl, phenazinyl, phenothiazinyl, and phenoxazinyl.

The term "heteroaryl" refers to a monocyclic, or fused or spiro polycyclic, aromatic heterocycle (ring structure having ring atoms selected from carbon atoms as well as nitrogen, oxygen, and sulfur heteroatoms) having from 3 to 12 ring atoms per ring.

The term "optionally substituted" means that the specified group is unsubstituted or substituted by one or more substituents.

In embodiments, the at least one terminal cross-linkable group of the epoxy compound is a hydroxyl group, which is reactive with a terminal cross-linkable group of the cross-linker compound, e.g. an isocyanate group. In an embodiment, the epoxy compound is glycidol.

In embodiments, the amount of epoxy compound in reacting step (a) is selected to provide a suitable amount of epoxy functional groups on the one or more precursor compounds for further reaction in reacting step (c).

The molar ratio of the cross-linker compound to the epoxy compound in reacting step (a) is dependent on the number of cross-linkable peripheral groups on the cross-linker compound and the number of cross-linkable peripheral groups on the epoxy compound available to cross-link with each other. The number of cross-linkable peripheral groups on the cross-linker compound available to cross-link with the cross-linkable peripheral groups on the epoxy compound may be (a-1), wherein a is the total number of cross-linkable peripheral groups on the cross-linker compound and wherein a is 2 or more. The number of cross-linkable peripheral groups on the epoxy compound available to cross-link with the cross-linkable peripheral groups on the cross-linker compound may be b, wherein b is 1 or more.

In an embodiment, the molar ratio of the cross-linker compound to the epoxy compound in reacting step (a) is 1:1. In this embodiment, a is 2 and b is 1. That is, one cross-linkable group of the cross-linker compound reacts with one cross-linkable group of the epoxy compound to form the precursor compound.

In other embodiments, the molar ratio of the cross-linker compound to the epoxy compound in reacting step (a) may range from about 1:0.8 to about 1:1.2.

The reacting step (a) may be undertaken at controlled temperature conditions. This advantageously ensures that step (a) is undertaken safely and to prevent any runaway reactions. In embodiments, the reacting step (a) may be undertaken at a temperature from about 10° C. to about 40° C., or about 15° C. to about 40° C., or about 20° C. to about 40° C., or about 20° C. to about 35° C., or about 20° C. to about 30° C.

In embodiments, the reacting step (a) may be conducted in the presence of an appropriate solvent and/or a catalyst. The reacting step (a) may be agitated throughout the reaction.

The hyperbranched polymer in mixing step (b) may be one as disclosed herein. In embodiments, the hyperbranched polymer in mixing step (b) may comprise only peripheral reactive hydroxyl groups, i.e. an unmodified hydroxyl functional hyperbranched polymer. Advantageously, unmodified hydroxyl functional hyperbranched polymers may be commercially available and therefore may be a convenient reactant for use in the disclosed method.

In embodiments, one or more of the hyperbranched polymers as disclosed herein may be mixed in mixing step (b).

The compound having one or more hydrophilic functional groups, i.e. the hydrophilic compound, may be one as disclosed herein. In embodiments, the hydrophilic compound may be selected from the group consisting of: alcohols, carboxylic acids, hydroxyl acid, halogenated alkyls, halogenated olefins, amines, alkylamines, alkenylamines, olefinic alcohols, cycloalkyl alcohol, cycloalkenyl alcohol and mixtures thereof. In an embodiment, the hydrophilic compound is a cycloalkyl alcohol. In an embodiment, the cycloalkyl alcohol is cyclohexanedimethanol. The mixing step (b) may comprise mixing one or more hydrophilic compounds with the hyperbranched polymer.

The hyperbranched polymer in step (b) may not be dispersible in an aqueous solvent. The hydrophilic compound may be present in mixing step (b) in an amount selected to advantageously enable the hyperbranched polymer to be dispersed therein. In embodiments, the hydrophilic compound enables the increase in dispersibility of the hyperbranched polymer in aqueous solvents. Advantageously, the dispersibility of the hyperbranched polymer in an aqueous solvent is improved when the hydrophilic compound is present in the aqueous solvent as compared to the dispersibility of the hyperbranched polymer in an aqueous solvent that does not comprise the hydrophilic compound. The amount of hydrophilic compound present in mixing step (b) may enable the resultant composition to advantageously achieve an aqueous-dispersible composition.

In embodiments, the weight ratio of the hyperbranched polymer to the hydrophilic compound in mixing step (b) may be selected to be in a range of from about 1:10 to about 10:1. In embodiments, the weight ratio of the hyperbranched polymer to the hydrophilic compound in mixing step (b) is one as disclosed herein. In one embodiment, the mixing step (b) may comprise providing a weight ratio of the hyperbranched polymer to the hydrophilic compound of about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1 or about 9:1.

In embodiments, the mixing step (b) may be undertaken at a temperature from about 120° C. to about 150° C., or about 130° C. to about 150° C., or about 140° C. to about 150° C., or about 120° C. to about 140° C. In an embodiment, the mixing step (b) may be undertaken at a temperature of 120° C.

The mixing step (b) may comprise physical blending, wherein the physical blending is performed under rigorous agitation, for instance, by stirring until the polymer solution turns homogeneous.

In embodiments, the reacting step (c) is undertaken at stoichiometric conditions selected to render the formed epoxy-functionalized hyperbranched polymer dispersible in an aqueous solvent.

Each unreacted cross-linkable peripheral group of the precursor compound may react with each native peripheral reactive hydroxyl group of the hyperbranched polymer. Upon reaction of the hyperbranched polymer with the precursor compound in step (c), the hyperbranched polymer is functionalized with epoxy functional group(s) from the precursor compound. Hence, the epoxy-functionalized hyperbranched polymer may comprise native peripheral reactive hydroxyl groups as well as peripheral reactive epoxy groups.

An exemplary, non-limiting, reaction mechanism of reacting step (c) is shown in FIG. 1, wherein the hyperbranched polymer of step (b) comprises n moles of native peripheral reactive hydroxyl groups. Upon reaction with m moles of precursor compound comprising one peripheral epoxy functional group in step (c), the functionalized hyperbranched polymer comprises m moles of peripheral reactive epoxy groups and (n-m) moles of peripheral reactive hydroxyl groups.

The amount of precursor compound in step (c) may be selected to allow the hyperbranched polymer to be functionalized with a suitable number of epoxy functional groups and yet maintain dispersibility in the aqueous solvent. In embodiments, the amount of precursor compound in step (c) is selected to result in about 2.5% to about 20% of the total number of peripheral reactive groups of the hyperbranched polymer to be epoxy functional groups.

In other embodiments, the number of peripheral epoxy functional groups of the precursor compound is selected to be in a range of from about 2.5% to about 20% of the total number of peripheral reactive groups of the hyperbranched polymer. In these embodiments, the epoxy-functionalized hyperbranched polymer comprises peripheral epoxy groups in a range of about 2.5% to about 20% of the total number of peripheral reactive groups of the hyperbranched polymer. In an embodiment, the number of peripheral epoxy functional groups of the precursor compound is selected to be not greater than about 10% of the total number of peripheral reactive groups of the hyperbranched polymer.

In embodiments where the hyperbranched polymer in step (b) is a hydroxyl functional hyperbranched polymer, the number of peripheral epoxy functional groups of the precursor compound in step (c) may be selected to result in the epoxy-functionalized hyperbranched polymer comprising a ratio of the number of hydroxyl functional groups to epoxy functional groups of from about 100:1 to about 5:1, or from about 25:1 to about 10:1.

In embodiments, the reacting step (c) may be undertaken at a temperature to maintain the reaction in melt form. The reacting step (c) may be undertaken at a temperature from about 50° C. to about 100° C., or about 60° C. to about 100° C., or about 70° C. to about 100° C., or about 80° C. to about 100° C., or about 50° C. to about 90° C., or about 50° C. to about 80° C., or about 50° C. to about 70° C., or about 60° C. to about 90° C. In an embodiment, the reacting step (c) may be undertaken at a temperature of 80° C.

The reacting step (c) may be conducted under agitation.

In embodiments, the reacting step (c) may be undertaken in the presence of an aqueous solvent. In embodiments, the reacting step (c) may be undertaken in the presence of additional hydrophilic compound. In such embodiments, the weight ratio of the hyperbranched polymer to the hydrophilic compound in reacting step (c) may be selected to be in a range of from about 1:10 to about 10:1, or about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1 or about 9:1. In embodiments, the weight ratio of the hyperbranched polymer to the hydrophilic compound in reacting step (c) is one as disclosed herein.

The aqueous solvent may be selected to be water. In an embodiment, the aqueous solvent is de-ionized water. The water may be present in an amount of from about 20% to about 40% by weight based on total weight of the composition. In one embodiment, the water may be added in an amount of about 25%, about 30%, or about 35% by weight based on the total weight of the composition.

In embodiments where the formed hyperbranched polymer is functionalized with further functional groups, in addition to epoxy functional groups, the further functional groups may also be grated in a similar method as disclosed herein.

In embodiments, the reacting step (c) may be undertaken in the presence of one or more surfactants.

Advantageously, the addition of additional hydrophilic compound and/or surfactant imparts further stability to the dispersion.

The disclosed composition may be used to prepare a coating composition that is aqueous-dispersible. The coating composition may be advantageously formulated as a single component, one-pot/one-pack coating composition.

In one embodiment, the coating composition comprises a composition comprising a hyperbranched polymer that has been modified with epoxy functional groups as described above or has been prepared by the methods described above, and one or more cross-linkers. The coating composition may be provided as a one-pot formulation.

The amount of composition comprising the epoxy-modified hyperbranched polymer in the coating composition may range from about 1% by weight to about 10% by weight, or about 3% by weight to about 10% by weight, or about 5% by weight to about 10% by weight, or about 1% by weight to about 9% by weight, or about 3% by weight to about 9% by weight, or about 4% by weight to about 9% by weight, or about 5% by weight to about 9% by weight, based on the total weight of the coating composition without the composition comprising the epoxy-modified hyperbranched polymer.

Suitable cross-linkers to be included in the one-pot formulation may be selected from isocyanates, diisocyanates, triisocyanates, isocyanurates, polyisocyanates, blocked isocyanates, blocked polyisocyanates, melamine formaldehyde resins, epoxy resins, carbodiimide compounds, aziridine-functional compounds and mixtures thereof. In one embodiment, the cross-linker is selected to be one which is capable of reacting with or forming a covalent bond with the peripheral reactive functional groups of the hyperbranched polymer (e.g., —OH or epoxy). In embodiments, the cross-linker is selected to be one which is capable of reacting or forming covalent bonds with the unmodified/native peripheral reactive hydroxyl groups of the hyperbranched polymer.

The cross-linker may be selected from melamine formaldehyde resins. In one embodiment, the melamine formaldehyde resin is a hexamethoxymethyl-melamine formaldehyde resin. In another embodiment, the cross-linker may be a melamine resin such as a methylated, butylated melamine resin.

In an embodiment, the cross-linker may have a general formula R—N=C=O, wherein R may be selected from substituted or non-substituted, aliphatic or aromatic alkyls, alkenyls, aryls and the like. In another embodiment, the cross-linker may be a di-isocyanate having a general formula O=C=N—$R_1$-$R_2$—N=C=O, wherein $R_1$ and $R_2$, being same or different, may be independently selected from substituted or non-substituted, aliphatic or aromatic, alkyls, alkenyls, aryls and the like.

The cross-linker may also be a blocked compound wherein its cross-linkable moiety is chemically reacted with a blocking agent to substantially prevent it from reacting with the hyperbranched polymer. In one embodiment, the cross-linker can be a blocked isocyanate selected from the list disclosed above. The blocked isocyanate may be used in the disclosed single component (1K) coating compositions wherein the cross-linker is provided in admixture with the aqueous-dispersible polymer composition and does not require a separate mixing step prior to applying the composition as a coating onto a surface. In one embodiment, the blocked isocyanate may be freed for reaction via the application of heat.

Advantageously, through condensation reactions with the cross-linkers, the disclosed compositions are capable of forming aqueous-based coatings on a surface.

In one embodiment, these aqueous-based coatings may be further subjected to a step of heat curing and/or drying to remove the entrained water, to thereby increase the cross-linking density between the hyperbranched polymers.

In another embodiment, the disclosed coating composition may be curable at room temperature, i.e. about 10° C. to about 30° C. Advantageously, the peripheral reactive epoxy functional groups of the functionalized hyperbranched polymer are able to react with the cross-linkers at room temperature and thereby form coatings on a surface.

The coating composition may further comprise a non-dendritic polymer selected from polyester, polyurethane, polyacrylate, polyol, polyimide, copolymers and polymer blends thereof.

In another embodiment, the coating composition may further comprise one or more acrylate-functional compounds. Advantageously, the acrylate-functional compounds may be capable of forming free radicals upon exposure to ultra-violet (UV) radiation, thereby increasing the cross-linking density of the coating composition. Advantageously, the presence of acrylate-functional compounds may allow the water-based coatings to be subject to UV curing.

The one pack formulation may further contain one or more additives, including a photoinitiator compound, a UV-stabilizer compound, nanoparticles and/or mixtures thereof.

The nanoparticle can be selected from ceramic particles or inorganic minerals. In embodiments, the nanoparticle is selected from metallic and/or non-metallic oxides including but not limited to calcium oxide, magnesium oxide, beryllium oxide, aluminum oxide, zinc oxide, silicon oxides, and their mixtures thereof. In one embodiment, the nanoparticle is silicon dioxide. Advantageously, the addition of the silicon dioxide nanoparticles can improve the hardness of the coating and enhance its hydrophilic properties, further improving the coating's resistance to dirt.

In embodiments, the nanoparticles may be encapsulated with a hydroxyl functional fluorosurfactant and/or a hydroxyl functional polymer. Advantageously, the encapsulation of these nanoparticles may allow homogeneous dispersion of the nanoparticles within the cross-linked polymer matrix and further prevents the nanoparticles from sloughing off from the coating when contacted with abrasive forces.

The nanoparticles may have a uniform or a substantially uniform particle size distribution of about 1 nm to about 1000 nm, 10 nm to 1000 nm, 10 nm to 900 nm, 10 nm to 800 nm, 10 nm to 700 nm, 10 nm to 600 nm, 10 nm to 500 nm, 10 nm to 400 nm, 10 nm to 300 nm, 10 nm to 200 nm, 10 nm to 100 nm, or 10 nm to 50 nm. In other embodiments, the nanoparticles have a particle size distribution of about 10 nm to about 100 nm, 10 nm to 30 nm, 10 nm to 50 nm, 10 nm to 70 nm, or 10 nm to 90 nm.

The photoinitiator compound can be any compound that is capable of initiating photo-polymerization of unsaturated functional groups (e.g., acrylates). Photoinitiator compounds may be capable of forming radicals upon absorbing radiation to thereby initiate, propagate or catalyze polymerization or cross-linking reactions in a mixture or composition to which they have been introduced.

Exemplary catalysts may be organometallics and tertiary amines, such as a dibutyltin compound (dibutyltin dilaurate and dibutyltin diacetate), Triethylenediamine (TEDA), Triethylamine (TEA), Triethanolamine, N,N-dimethylethanolamine (DMEA), N,N-dimethylpiperazine, N-ethylmorpholine. In another embodiment, the catalyst may be a strong acid or a weak acid, such as a sulfonic acid. Exemplary acid catalysts may also include dodecylbenzyl sulfonic acid, p-toluenesulfonic acid, DNNDSA (dinonylnapthalene disulphonic acid), DDBSA (dodecyl benzene sulphonic acid), DNNSA (dinonylnapthalene monosuplphonic acid), phosphates (alkyl acid phosphates), metal salts and carboxylic acids. Preferably, acid catalysts are used when the cross-linkers used belong to the class of melamine and expoxy resins. Alternatively, organometallic and tertiary amines are mostly used as catalysts when the cross-linkers used belong to the class of isocyanates.

The composition may further comprise an alkoxide, the alkoxide having a general formula $M(Z)_n$, wherein n is 3 or 4; M is selected from the group consisting of: Zr, Al, Ti, Sn and Si; and wherein (Z) is a reactive hydrolysable group selected from a halide or an (OR) group, wherein R is hydrogen (H), acetoxy or an alkyl group having 1 to 6 carbon atoms. In one embodiment, the halide group can be selected from the group consisting of fluoride (F), bromide (Br) chloride (Cl) and iodide (I). In one embodiment, Z is Cl. In one embodiment, R is selected from methyl, ethyl or phenyl. In another embodiment, R is —$CH_3C=O$ (acetoxy).

In one embodiment, the alkoxide may be a siloxane compound having a general formula of $Si(Z)_n$.

The composition may further comprise one or more silane compounds. In one embodiment, the silane compounds may comprise at least one reactive group capable of reacting with an inorganic compound and at least one organofunctional group capable of reacting with an organic compound.

In one embodiment, the silane compounds are organosilanes having the general structure:

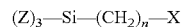

$(Z)_3$—Si—$(CH_2)_n$—X wherein Z is a reactive hydrolysable group selected from a halide or an (OR) group, wherein R is hydrogen (H), acetoxy or an alkyl group having 1 to 6 carbon atoms; X is a organofunctional group, selected from amine, amino, amine, hydroxyl, carboxyl, epoxide, methacrylate, mercaptan (SH), alkyl, alkylene, vinyl, isocyanate, carbamate and combinations thereof; and n is an integer from 1 to 10.

In one embodiment, the halide group can be selected from the group consisting of fluoride (F), bromide (Br) chloride (Cl) and iodide (I). In one embodiment, Z is Cl. In one embodiment, R is selected from methyl, ethyl or phenyl. In another embodiment, R is —$CH_3C=O$ (acetoxy).

In one embodiment, the organosilane can be a bifunctional organosilane, that is, having a general formula:

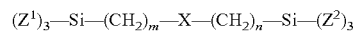

$(Z^1)_3$—Si—$(CH_2)_m$—X—$(CH_2)_n$—Si—$(Z^2)_3$ wherein X is as defined above; $(Z^1)$ and $(Z^2)$, being same or different, are as defined above; n and m are integers, independently selected from 1 to 10.

In one embodiment, the organosilane compound is a bifunctional trimethoxysilyl aminosilane, wherein X is amino and where $(Z^2)$ and $(Z^1)$ are methoxy.

In another embodiment, the organosilane compound is a monofunctional trimethoxysilyl epoxysilane, wherein X is epoxy and $(Z^2)$ and $(Z^1)$ are methoxy.

The silane compounds may be present in an amount of at least about 0.01% by weight based on the total weight of the aqueous dispersible polymer composition. In another embodiment, the silane compounds may be in an amount from about 0.01% to about 10% by weight based on the total weight of the polymer composition. In yet another embodiment, the silane compounds may be present in an amount of about 25%, about 30%, about 35%, about 40%, about 45%, about 50%, about 55%, about 60%, about 65%, about 70%, about 75%, about 80%, about 85%, about 90% or about 95% by weight, based on the total weight of the polymer composition.

Advantageously, the silane compounds may help to improve the adhesion properties of a coating formed from the disclosed aqueous dispersible polymer composition. In particular, the silane compounds may improve the ability of the formed coating to adhere to inorganic substrates, such as glass, metal, minerals or ceramics. Further advantageously, the silane compounds may also act as cross-linkers to promote cross-linking between the hyperbranched polymers, thereby increasing the cross-linking density. As a result, the formed coatings may exhibit improved hardness, chemical and moisture resistance.

It is to be noted that the embodiments recited herein may be applicable to the various aspects in the present disclosure.

EXAMPLES

Non-limiting examples of the invention and a comparative example will be further described in greater detail by reference to specific Examples, which should not be construed as in any way limiting the scope of the invention.

Materials Used

Below is a list of the raw materials used in the following Examples. The commercial names (in bold) of the following raw chemicals will be used in the Examples for convenience.

1. Dendritic polymer with theoretically 64 peripheral hydroxyl groups, having a molecular weight of about 5100 g/mol solid, OH value 470-500, ("Boltorn H40™") procured from Perstorp Singapore Pte Ltd.

2. Cycloaliphatic diol that is composed of approximately a 1:1 ratio of (cis, trans)-1,3-cyclohexanedimethanol and (cis, trans)-1,4-cyclohexanedimethanol, with a molecular weight of 144.21, hydroxyl number of 778, ("Unoxol Diol™") produced from Dow Chemical Pacific (Singapore) Pte Ltd.

3. Glycidol that is composed of an epoxide and an alcohol functional group, 96% purity, produced from Sigma Aldrich, Missouri, USA.

4. Isophorone diisocyanate monomer ("Desmodur® I") from Bayer (South East Asia) Pte Ltd.

5. Non-ionic surfactant ("Tween-20") produced from Sigma Aldrich, Missouri, USA.

6. Non-ionic alcohol ethoxylate surfactant ("ECOSURF™ BD-405") produced from Dow Chemical Pacific (Singapore) Pte Ltd.

7. Dipropylene Glycol Dimethyl Ether (Proglyde DMM) produced from Dow Chemical Company, Michigan, USA.

Testing Methods

In the following Examples, the following industrially recognized testing methods are used to characterize the water-dispersible coatings:

Adhesion (1 mm×1 mm): ASTM D3359;
Impact (as measured in kg·cm(direct)): ASTM D2794;
Pencil Hardness (Break/Scratch): ASTM D3363;
Flexibility (⅛"): ASTM D5222;
Erichsen cupping: DIN EN ISO 1520
Taber abrasion: ASTM D1044
Scratch resistance: ISO12137-2:1997

In addition, a water and chemical resistance test (also referred to as "chemical soaking") is used to determine the degree of resistance of the composition to water and certain chemicals such as 5% NaOH, 5% $H_2SO_4$, 60% ethanol, as test solutions. The following protocol will be adopted for the water and chemical resistance test:

(i) Prepare film on a glass panel with 75 μm wet film thickness ("WFT");
(ii) Dry the panel at a predetermined temperature for a predetermined duration (temperature and curing time depend on specific coatings) prior to testing;
(iii) Saturate a cotton bud with the test solutions and place the saturated cotton bud on top of the test surface;
(iv) Enclose with a closed container to ensure saturation;
(iv) Observe the test surface after a predetermined duration.

Further, the protocol for pencil hardness (break) after chemical soaking is as follows:

(i) Make a cross hatch cut on a coating film;
(ii) Place cotton bud saturated with chemicals such as 5% NaOH, 5% $H_2SO_4$ or 60% ethanol over the cuts for a predetermined duration;
(iii) Remove the saturated cotton and immediately test break hardness at the wet cut intersection with Mitsubishi pencil.

Comparative Example 1

Preparation of Aqueous Dispersible Dendritic Polymer Composition

Boltorn H40 (powder) and Unoxol Diol were mixed in a 100 ml round bottle flask at a weight ratio of 2:8. The mixture turned homogenous after about 1 to 2 hours of stirring.

43 wt % deionized (D.I.) water, based on the weight of H40 and Unoxol Diol, was added and the mixture was stirred for another 5 minutes to form an aqueous dispersible dendritic polymer solution with a solid content about 70%.

0.1 wt % of Tween 20 and 0.1 wt % of Ecosurf BD405 were added and stirred for 5 minutes.

0.7 wt % of TEA was added and stirred for 10 mins.

Examples 2A-2D

Preparation of Aqueous Dispersible Epoxy Functional Dendritic Polymer Composition (i) Preparation of IPDI-glycidol precursor (IPDI-GC):

Under Nitrogen protection, glycidol (48.0 g) was added over 30 minutes into a mixture of IPDI (120.0 g), DMM (48.0 g) and dibutyltin dilaurate (DBTDL) (0.432 g) at 15-20 degree C. The mixture was stirred at 20 degree C. for about 2 h until the percentage of —NCO groups reached a theoretical value of 8.38 wt %.

(ii) Preparation of Epoxy Grafted Dendritic Polymer:

Under Nitrogen protection, Boltorn H40 (25.0 g) and Unoxol Diol (50.0 g) were heated to 120 degree C. to give a clear solution.

Upon cooling to 80 degree C., IPDI-GC (64.6 g) was added over 30 min with stirring to produce a modified dendritic polymer comprising 10% epoxy groups of the total number of peripheral groups.

The resulting mixture was stirred for another 1 h at the same temperature. Additional Unoxol Diol (50.0 g) and deionized water (102.3 g) were added at 80 degree C., followed by addition of Tween 20 (0.29 g) and BD-405 (0.29 g).

Figure 2:
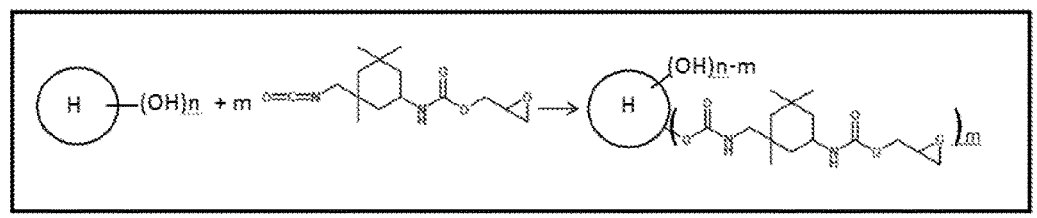
FIG. 2 is a schematic reaction scheme showing an exemplary, non-limiting, reaction mechanism associated with the disclosed method when a specific precursor compound as used in Example 2 is used.

The reaction mechanism of step (ii) is shown in FIG. 2. As seen in FIG. 2, a dendritic polymer (such as Boltorn H40) comprising n moles of hydroxyl peripheral reactive groups is reacted with m moles of the IPDI-GC precursor to yield a functionalized dendritic polymer comprising m moles of peripheral reactive epoxy groups and (n-m) moles of peripheral reactive hydroxyl groups. Specifically, the cross-linkable hydroxyl peripheral group of the glycidol reacts with the cross-linkable isocyanate peripheral group of the IPDI cross-linker compound to form the IPDI-GC precursor compound having a carbamate linkage. The IPDI-GC precursor compound has an unreacted cross-linkable isocyanate peripheral group and a peripheral epoxy functional group. The isocyanate peripheral group of the precursor compound then reacts with the native hydroxyl peripheral group of the dendritic polymer via a carbamate linkage to form the epoxy-functionalized dendritic polymer.

The above procedure was repeated to produce different percentages of epoxy modification, i.e. 5%, 3.3% and 2.8% epoxy groups of the total number of peripheral groups. The in-can appearances of the various compositions, including the composition comprising the unmodified Boltorn H40 of Comparative Example 1, are tabulated in Table 1 below.

TABLE 1

| Examples | % modification | In-can appearance |
|---|---|---|
| 1 | 0 | Clear |
| 2A | 2.8 | Clear |
| 2B | 3.3 | Clear |
| 2C | 5 | Near clear |
| 2D | 10 | Phase separation |

Table 1 shows that with higher percentage modification of the native hydroxyl peripheral groups with epoxy groups, the polymer solutions became less clear.

Example 3

Preparation of Coating Compositions Based on Addition of the Aqueous Polymer Compositions of Comparative Example 1 and Examples 2A to 2D into Commercial Water Reducible Acrylic Product The aqueous dispersible dendritic polymer solutions obtained from Comparative Example 1 and Examples 2A to 2D were each added into a commercial water reducible acrylic product, admixed with a melamine cross-linker to form one-component (1K) coating compositions.

As an illustrative example, the components of a 1K coating composition with and without the aqueous dispersible dendritic polymer solution are provided in Table 2.1 below (listed in the order that they are added):

TABLE 2.1

| Formulation | Commercial acrylic (WT %) | Example 3 (WT %) |
|---|---|---|
| Acrylic resin | 10.00 | 10.53 |
| Water | 2.00 | 2.11 |
| DMEA | 0.20 | 0.21 |
| Tego 750W | 1.00 | 1.05 |
| BYK 024 | 0.20 | 0.21 |
| TiO$_2$ R902 | 25.00 | 26.31 |
| Acrylic resin | 25.52 | 13.24 |
| Epoxy modified dendritic polymer dispersion | 0.00 | 8.42 |
| Luwipal 072 | 9.47 | 9.47 |

TABLE 2.1-continued

| Formulation | Commercial acrylic (WT %) | Example 3 (WT %) |
|---|---|---|
| Tego Flow 425 | 0.11 | 0.11 |
| Tego Wet 245 | 0.21 | 0.21 |
| Butyl Cellosolve | 18.78 | 22.63 |
| Water | 5.26 | 5.26 |
| Nalzin FA179 | 0.21 | 0.21 |
| Total | 100.00 | 100.00 |

All the coating compositions prepared with an addition of the aqueous polymer solutions of Comparative Example 1 and Examples 2A to 2D were capable of film formation in a 1K melamine system. The appearances of the films formed on clear glass were transparent and clear, as shown in Table 2.2.

Using the pencil-hardness test (break) after chemical soaking, it was demonstrated that the 1K melamine system coatings prepared with 8.42 wt % addition of aqueous dispersible dendritic polymer composition without epoxy functionality (Example 3A) possesses improved pencil hardness (break) at H as compared to the 1K melamine system without dendritic polymer which has a pencil hardness (break) of F-H. There was further improvement to 2H when 3.3%, 5% and 10% epoxy modified dendritic polymers were added, as shown in Table 2.2.

TABLE 2.2

| Result | Commercial acrylic | Example 3A | Example 3B | Example 3C | Example 3D | Example 3E |
|---|---|---|---|---|---|---|
| Drop in of 6.8% aqueous dispersible dendritic polymer | — | 0% modified | 2.8% modified | 3.3% modified | 5% modified | 10% modified |
| On clear glass | | | | | | |
| Appearance | Clear | Clear | Clear | Clear | Clear | Clear |
| Pencil Hardness after soaking | | | | | | |
| 1 hr-Alcohol (60%) | F-H | H | H | 2H | 2H | 2H |
| 1 hr-Water | F-H | H | H | H/2H | H/2H | H/2H |

Further, coating compositions with and without a drop-in of the aqueous polymer composition of Example 2C into a commercial acrylic emulsion were prepared. The components of the 1K coating compositions are provided in Table 2.3 below (listed in the order that they are added):

TABLE 2.3

| 1K Preparation Wt % | Commercial acrylic emulsion Example 4A | Example 3F |
|---|---|---|
| Water | 6.12 | 6.12 |
| 80% UH-814N(20% BC) | 0.61 | 0.61 |
| AMP95 | 0.12 | 0.12 |
| Disperbyk 187 | 0.55 | 0.55 |
| BYK 154 | 0.56 | 0.56 |
| Togo Airex 902W | 0.24 | 0.24 |
| Tipure R 706 | 30.6 | 30.6 |
| Water | 1.65 | 1.65 |
| Acrylic emulsion | 46.44 | 37.95 |

TABLE 2.3-continued

| 1K Preparation Wt % | Commercial acrylic emulsion Example 4A | Example 3F |
|---|---|---|
| DMEA | 0.36 | 0.3 |
| Butyl Cellusolve | 4.89 | 5.25 |
| BYK 024 | 0.12 | 0.12 |
| Cymel 325 | 7.14 | 7.14 |
| 5% modified dendritic polymer solution | 0 | 5.95 |
| Nalzin FA 179 | 0.6 | 0.6 |
| Water | 0 | 2.24 |
| Total | 100 | 100 |

The coating prepared from a formulation with 5.95% of aqueous dispersible dendritic polymer showed improvement as compared to the coating prepared without dendritic polymer in impact resistance, flexibility, scratch resistance, abrasion resistance, alkaline resistance and water resistance as shown in Table 2.4.

TABLE 2.4

| Results | Example 4A | Example 3F |
|---|---|---|
| On sanded tin panel | | |
| Adhesion (1 mm × 1 mm) | 5B | 5B |
| Pencil Hardness (Scratch/Break) | 2H/3H | 2H/3H |
| Impact Resistance, kg · cm | 35 | 50 |
| ERICHSEN Cupping, mm | 3.51 mm | 4.10 mm |
| On aluminium panel | | |
| Gloss (20°/60°/85°) | 30.1/75.7/95.6 | 16.8/64.9/92.5 |
| Taber Abrasion, mg of wt loss | 93.5 | 80.2 |
| Scratch Resistance, g | 150 | 230 |
| Spot test Sanded tin panel | | |
| Water, 16 hrs | Dense tiny blisters | No changes |
| Water, 24 hrs | Dense Mediums blisters | Few tiny blisters |
| 60% Ethanol, 24 hrs | No changes | No changes |
| 5% H2SO4, 16 hrs | Dense large blisters | Dense large blisters |
| 5% H2SO4, 24 hrs | Dense large blisters | Dense large blisters |
| 5% NaOH, 16 hrs | Dense Mediums blisters | Dense tiny blisters |
| 5% NaOH, 24 hrs | Dense large blisters | Dense Mediums blisters |
| 0.1N H2SO4, 24 hrs | Dense Mediums blisters | Dense Mediums blisters |
| 0.1N NaOH, 24 hrs | Dense tiny blisters | No changes |

APPLICATIONS

It will be appreciated that the disclosed polymer compositions and methods can be used to prepare aqueous-based coating compositions which are organic solvent-free and accordingly emit little or no volatile organic compounds at all.

It can be further appreciated that the disclosed aqueous dispersible compositions may be prepared with a simple modification step of providing peripheral epoxy groups onto a hyperbranched polymer. As a result, the disclosed polymer compositions can be used to prepare aqueous-based coatings having improved chemical/water resistance compared to conventional aqueous-based coatings that utilize ionic-functionalized polymers.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A composition comprising:
   (i) a hyperbranched polymer having peripheral reactive groups comprising peripheral epoxy functional groups and peripheral hydroxyl functional groups; and
   (ii) a hydrophilic compound having one or more hydrophilic functional groups,
   wherein the amount of peripheral epoxy functional groups relative to the total number of peripheral reactive groups renders the hyperbranched polymer dispersible in an aqueous solvent, and wherein the weight ratio of the hyperbranched polymer to the hydrophilic compound is in a range of from 1:10 to 10:1.

2. The composition of claim 1, wherein the peripheral epoxy functional groups are present in a range of from 2.5% to 20% of the total number of peripheral reactive groups of the hyperbranched polymer; or
   wherein the peripheral epoxy functional groups are present in a positive amount of not greater than 10% of the total number of peripheral reactive groups of the hyperbranched polymer.

3. The composition of claim 1, wherein the weight ratio of the hyperbranched polymer to the hydrophilic compound is in a range of from 1:9 to 4:1.

4. The composition of claim 1, wherein the ratio of the number of peripheral hydroxyl functional groups to peripheral epoxy functional groups is in a range of from 100:1 to 5:1.

5. The composition of claim 1, wherein the epoxy functional group is covalently bonded to a hydroxyl functional group of the hyperbranched polymer by a cross-linker compound selected from the group consisting of diisocyanates, triisocyanates, polyisocyanates, isocyanurates and mixtures thereof; and said hydroxyl functional group was a peripheral hydroxyl functional group of the hyperbranched polymer prior to formation of said covalent bond.

6. The composition of claim 5, wherein the cross-linker compound is selected from the group consisting of diphenylmethane 4,4'-diisocyanate, methylenebis-4,4'-isocyanatocyclohexane, 1,6-hexamethylene diisocyanate (HDI), 1,4-cyclohexane diisocyanate, p-phenylene diisocyanate, triphenylmethane-4,4',4'',-triisocyanate, methylene diphenyl diisocyanate (MDI), toluene diisocyanate (TDI), tetramethylxylene diisocyanate, isophorone diisocyanate (IPDI) and mixtures thereof.

7. The composition of claim 1, wherein the hydrophilic functional groups of the hydrophilic compound are selected from the group consisting of hydroxyl groups, halogen groups, carbonyl groups, carboxyl groups and mixtures thereof.

8. The composition of claim 1, wherein the hydrophilic compound is cyclohexanedimethanol and wherein the aqueous solvent is water.

9. The composition of claim 1, wherein the hyperbranched polymer has a theoretical number of 16 to 128 total peripheral reactive groups per molecule of hyperbranched polymer.

10. An aqueous-dispersible single component coating composition comprising: the composition of claim 1; and one or more cross-linkers;
wherein the cross-linker is melamine formaldehyde resins.

11. A method of preparing a composition, comprising:
(a) reacting a cross-linker compound comprising at least two cross-linkable peripheral groups with an epoxy compound comprising at least one peripheral epoxy functional group and at least one cross-linkable peripheral group to form a precursor compound having at least one unreacted cross-linkable peripheral group and at least one peripheral epoxy functional group;
(b) mixing a hyperbranched polymer having peripheral hydroxyl groups with a hydrophilic compound having one or more hydrophilic functional groups, wherein the weight ratio of the hyperbranched polymer to the hydrophilic compound is in a range of from 1:10 to 10:1; and
(c) reacting the precursor compound with at least one peripheral hydroxyl group of the hyperbranched polymer to form a hyperbranched polymer having peripheral reactive groups comprising peripheral epoxy functional groups and peripheral hydroxyl functional groups,
wherein the amount of peripheral epoxy functional groups relative to the total number of peripheral reactive groups renders the hyperbranched polymer dispersible in an aqueous solvent.

12. The method of claim 11, wherein the reacting step (c) is undertaken at stoichiometric conditions selected to render the hyperbranched polymer having peripheral reactive groups comprising peripheral epoxy functional groups and peripheral hydroxyl functional groups dispersible in the aqueous solvent.

13. The method of claim 11, wherein the reacting step (c) is undertaken at stoichiometric conditions selected to yield a number of peripheral epoxy functional groups ranging from 2.5% to 20% of the total number of peripheral reactive groups of the hyperbranched polymer.

14. The method of claim 11, wherein the mixing step (b) is undertaken at a temperature from 120° C. to 150° C.

15. The method of claim 11, wherein the hyperbranched polymer in mixing step (b) is an unmodified hydroxyl functional hyperbranched polymer.

16. The method of claim 11, wherein the reacting step (c) is undertaken at stoichiometric conditions to yield a ratio of peripheral hydroxyl functional groups to peripheral epoxy functional groups ranging from 100:1 to 5:1.

17. The method of claim 11, wherein the cross-linker compound is selected from the group consisting of diphenylmethane 4,4'-diisocyanate, methylenebis-4,4'-isocyanatocyclohexane, 1,6-hexamethylene diisocyanate (HDI), 1,4-cyclohexane diisocyanate, p-phenylene diisocyanate, triphenylmethane-4,4',4",-triisocyanate, methylene diphenyl diisocyanate (MDI), toluene diisocyanate (TDI), tetramethylxylene diisocyanate, isophorone diisocyanate (IPDI) and mixtures thereof.

18. The method of claim 11, wherein the epoxy compound has the following structure:

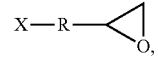

wherein X is selected from the group consisting of —SH and —OH, and R is independently selected from the group consisting of optionally substituted $C_1$-$C_6$ alkylene, optionally substituted $C_1$-$C_6$ heteroalkylene, optionally substituted carbocycle, optionally substituted arylene and optionally substituted heteroarylene.

19. The method of claim 11, wherein the at least one unreacted cross-linkable peripheral group of the precursor compound is an isocyanate group; and wherein the hydrophilic compound is cyclohexanedimethanol.

20. The method of claim 11, wherein the reacting step (a) is undertaken at a temperature from 10° C. to 40° C., and in the presence of water and/or one or more surfactants.

* * * * *